United States Patent
Chen

(10) Patent No.: US 9,877,291 B1
(45) Date of Patent: Jan. 23, 2018

(54) WIRELESS TRANSCEIVER APPARATUS AND METHOD CAPABLE OF CONTROLLING GAIN(S) OF AMPLIFIER(S) BY DETECTING POWER OF INTERFERENCE SIGNAL IN THE AIR WITH CONSIDERATIONS OF POWER SAVING AND SMALLER CIRCUIT AREA

(71) Applicant: PixArt Imaging Inc., Hsin-Chu (TW)

(72) Inventor: Peng-Sen Chen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 15/432,885

(22) Filed: Feb. 14, 2017

(30) Foreign Application Priority Data

Jul. 11, 2016 (TW) .............................. 105121784 A

(51) Int. Cl.
*H04B 1/04* (2006.01)
*H04W 52/52* (2009.01)
*H04W 4/00* (2009.01)

(52) U.S. Cl.
CPC ........... *H04W 52/52* (2013.01); *H04W 4/008* (2013.01)

(58) Field of Classification Search
CPC ... H04W 52/52; H04W 28/04; H04W 28/048; H04W 52/0238; H04W 52/243
USPC ................ 455/522, 574, 127.1, 127.5, 343.1
See application file for complete search history.

(56) References Cited

U.S. PATENT DOCUMENTS

| | | | | |
|---|---|---|---|---|
| 7,418,244 B2* | 8/2008 | Montalvo | ............ | H03G 3/3047 455/126 |
| 8,295,893 B2* | 10/2012 | Rao | ................... | H04W 52/0216 455/127.5 |
| 8,509,290 B2* | 8/2013 | Bellaouar | ............ | H03G 3/3047 330/10 |
| 8,774,874 B2* | 7/2014 | Gudem | ................ | H04B 1/1027 455/114.2 |
| 2004/0204036 A1* | 10/2004 | Yang | ...................... | H04B 1/403 455/553.1 |

* cited by examiner

*Primary Examiner* — Sonny Trinh
(74) *Attorney, Agent, or Firm* — Winston Hsu

(57) ABSTRACT

A wireless transceiver apparatus includes a power detector, an analog signal receiving circuit at wireless signal reception side, and a processing circuit. The power detector is configured at wireless signal transmission side and used for detecting power of a power amplifier on a transmitting path of wireless signal transmission side. The analog signal receiving circuit is couple to the power detector and used for receiving a wireless signal form an antenna. Under signal reception mode, the analog signal receiving circuit transmits the received wireless signal to the processing circuit. Under interference detection mode, the analog signal receiving circuit transfers the received wireless signal (as interference) to the power detector, and the power detector is used for detecting the power of wireless signal to measure an interference power value and transmit the value to the processing circuit.

10 Claims, 4 Drawing Sheets

WIRELESS TRANSCEIVER APPARATUS AND METHOD CAPABLE OF CONTROLLING GAIN(S) OF AMPLIFIER(S) BY DETECTING POWER OF INTERFERENCE SIGNAL IN THE AIR WITH CONSIDERATIONS OF POWER SAVING AND SMALLER CIRCUIT AREA

BACKGROUND OF THE INVENTION

1. Field of the Invention

The invention relates to a wireless transceiver scheme, and more particularly to a wireless transceiver apparatus and corresponding method.

2. Description of the Prior Art

Generally speaking, conventional wireless transceivers based on Bluetooth communication standard suffer from the interference of Wi-Fi signals especially when the signal power of Bluetooth communication is smaller than that of Wi-Fi signals. For amplifiers such as low-noise amplifier (LNA) at the wireless signal reception side of the conventional Bluetooth communication transceivers, the interference of Wi-Fi signals usually cause signal saturation for the amplifiers since the amplifiers are designed to be more sensitive and with higher gain values. Thus, even though partial Wi-Fi signal interference can be filtered out by using filter(s) at the post-stage circuit, however, the signal saturation inevitably causes the poor quality for signal reception. The interference of Wi-Fi signals will not always exist, continuously and always enabling the detection for the interference will inevitably need additional circuit element(s) for detection and also consume more power. Using additional circuit element(s) for detection often means that further circuit area is needed and configured to implement the additional circuit element(s). it is difficult to design an interference detection scheme for Bluetooth transceiver(s) with the advantage of power saving.

SUMMARY OF THE INVENTION

Therefore one of the objectives of the invention is to provide a wireless transceiver apparatus and method applied for the wireless transceiver apparatus, to solve the above-mentioned problems.

According to embodiment of the invention, a wireless transceiver apparatus is disclosed. The wireless transceiver apparatus comprises a power detector, an analog signal receiving circuit, and a processing circuit. The power detector is configured at a wireless signal transmission side and used for detecting power of a power amplifier on a transmitting path of the wireless signal transmission side. The analog signal receiving circuit is configured at a wireless signal reception side and coupled to the power detector, and is used for receiving a wireless signal form an antenna. The processing circuit is coupled to the analog signal receiving circuit. Under a signal reception mode, the analog signal receiving circuit transmits the received wireless signal to the processing circuit. Under an interference detection mode, the analog signal receiving circuit transfers the received wireless signal to the power detector, and the power detector detects a power of the received wireless signal to measure an interference power value and transmit the interference power value to the processing circuit.

According to the embodiments, a method used for a wireless transceiver apparatus is disclosed. The method comprises: providing a power detector configured at a wireless signal transmission side; providing an analog signal receiving circuit configured at a wireless signal reception side, the analog signal receiving circuit receiving a wireless signal form an antenna; under a signal reception mode, utilizing the analog signal receiving circuit to transmit the received wireless signal to a processing circuit; and, under an interference detection mode: transferring the received wireless signal from the analog signal receiving circuit to the power detector; and utilizing the power detector to detect a power of the received wireless signal to measure an interference power value and transmit the interference power value to the processing circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
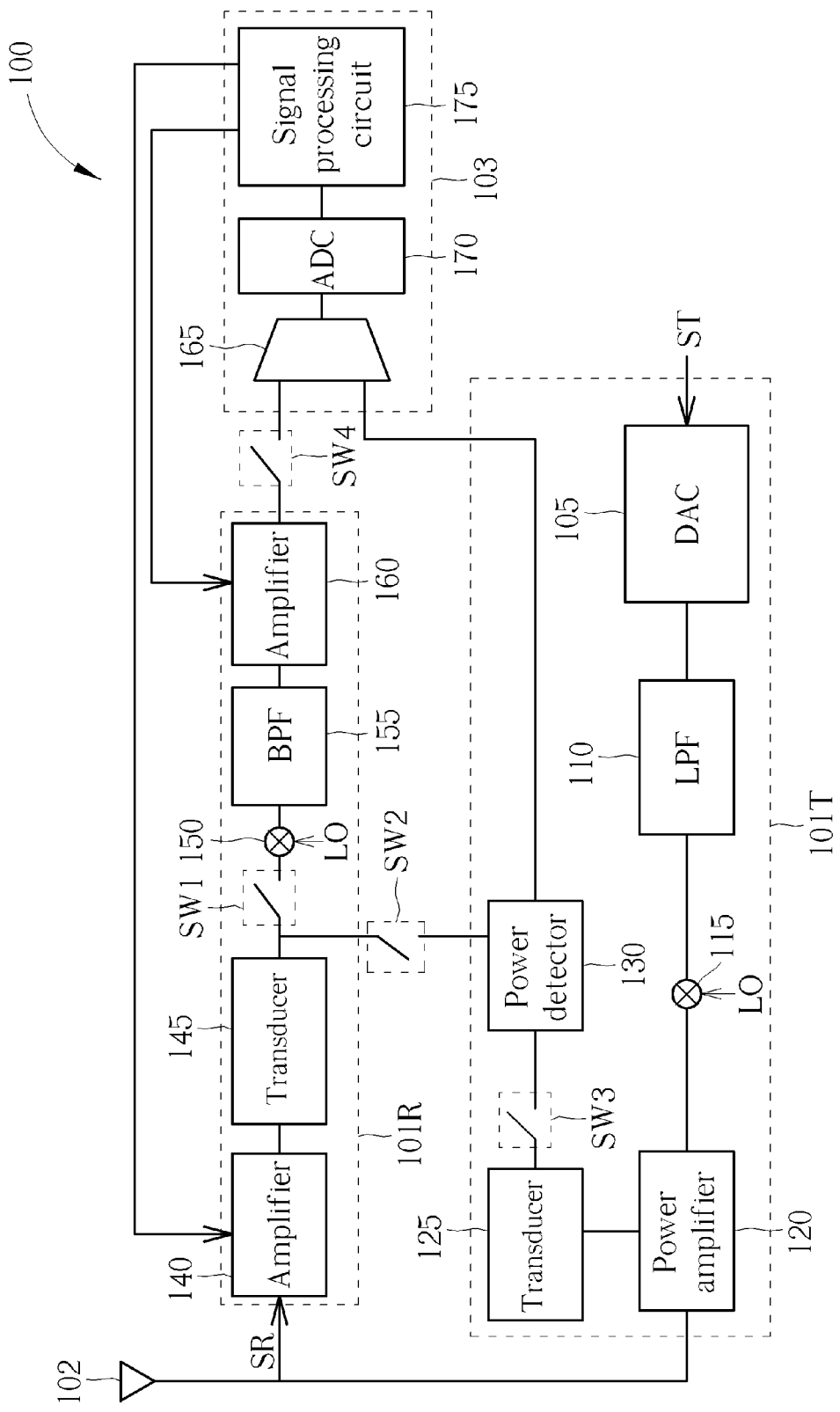
FIG. 1 is block diagram of a wireless transceiver apparatus according to an embodiment of the invention.

FIG. 1 is block diagram of a wireless transceiver apparatus 100 according to an embodiment of the invention. The wireless transceiver apparatus 100 comprises a wireless signal transmission side and a wireless signal reception side, and is used for transmitting a wireless signal and receiving a wireless signal, respectively. The wireless transceiver apparatus 100 can be applied to Bluetooth communication and includes a Bluetooth communication capability for receiving and sending a Bluetooth wireless communication signal (but not limited).

Bluetooth communication standard for example employs the frequency band of 2.4 GHz, and an adjacent frequency band for example is used by other communication standard such as Wi-Fi communication standard. The performance of a conventional wireless transceiver for Bluetooth communication is easily affected or influenced by Wi-Fi communication signals especially when the signal power of Bluetooth communication signal is smaller than the signal power of Wi-Fi communication signals. A low-noise amplifier (LNA) configured at the wireless signal reception side of the conventional transceiver for Bluetooth communication is usually designed with higher sensitivity for processing the signal and designed with a greater gain value. The LNA of the conventional transceiver usually and easily suffers from signal saturation resulted from the interference of Wi-Fi communication signals at adjacent frequency bands. A conventional scheme may employ a filter at a post-stage circuit to filter out partial interference generated from the Wi-Fi communication signals. However, the signal saturation for the LNA inevitably causes the poor quality for signal reception. Since the Wi-Fi communication signals may not always exist, continually and always detecting the interference of Wi-Fi signals would consume much power, and also needs an additional circuit for detection and thus more circuit areas are required to implement the additional circuit. It becomes more difficult to design a scheme for detection the interference source.

To solve the above-mentioned problems, the wireless transceiver apparatus 100 of the embodiment is arranged to perform interference detection operation by using partial circuit(s) on a transmitting path at the wireless signal transmission side and/or is arranged to execute the interference detection operation at a specific timing designed based on Bluetooth communication standard. The partial circuit(s) is/are shared for signal transmission and interference detection. The wireless transceiver apparatus 100 can appropriately detect energy/power of the interference of other wireless signals in the air to avoid signal saturation introduced to an LNA of the front-end circuit and/or signal saturation for amplifier(s) of the post-stage circuit, with consideration of power saving and without occupying additional circuit areas (or without adding other circuit elements) at the same time.

The wireless transceiver apparatus 100 performs interference detection operation by using partial circuit element(s) on the transmitting path at the wireless signal transmission side. For example, the wireless transceiver apparatus 100 employs at least a power detector, which is disposed on the transmitting path of the wireless signal transmission side and configured for performing power calibration upon a signal at the transmission side, to perform the interference detection operation. For signal transmission, the power detector is used for performing power calibration to maintain a wireless signal, to be transmitted to the air, at the same level. For interference detection, the power detector is used for detecting whether interference of other wireless signal exists and the power/energy of the interference. Since the power detector on the transmitting path at the transmission side is further employed to the perform interference detection operation, this would not need to implement more additional circuits to occupy additional circuit areas. Even additional detection circuits are not required.

Taking examples of Bluetooth communication application, the wireless transceiver apparatus 100 is arranged to activate/enable and enter the interference detection mode when is not arranged to receive Bluetooth data packet(s). For Bluetooth communication, a preparation time period (about 80-90 microseconds but not limited) is used for signal reception preparation before a Bluetooth data packet is received. The preparation time period for example is designed as a period before a preamble signal of the Bluetooth data packet is received. The wireless transceiver apparatus 100 is arranged to select this preparation time period as one of the periods/timings which can be used for performing the interference detection operation. The wireless transceiver apparatus 100 is capable of detecting whether the interference of Wi-Fi signal exists or not before receiving one Bluetooth data packet. In practice, the wireless transceiver apparatus 100 needs only 15 microseconds (but not limited) to perform the interference detection operation, so the reception of Bluetooth data packet(s) is not affected by the interference detection operation. Additionally, the wireless transceiver apparatus 100 can be arranged to activate/enable the interference detection mode and enter the interference detection mode to perform the interference detection operation when determining that a Bluetooth data packet has been lost, determining that the packet error rate becomes much higher abnormally, or when one Bluetooth data packet has been received successfully. Compared to the conventional scheme continuously detecting the interference of Wi-Fi signals, the wireless transceiver apparatus 100 of this embodiment can save more power. It is suitable to apply the wireless transceiver apparatus 100 to a portable electronic device such as a wearable electronic device. Further, it should be noted that the above mentioned timings/periods used for performing interference detection operation are merely used for illustrative purposes but not meant to be limitations of the invention. The interference detection operation can be performed at different timings or performed during different periods in a Bluetooth communication system.

Refer back to FIG. 1. In practice, the wireless transceiver apparatus 100 includes a transmitting circuit 101T on a signal transmitting path at the wireless signal transmission side, an analog signal receiving circuit 101R on a signal receiving path at the wireless signal reception side, an antenna unit 102, and a processing circuit 103. The transmitting circuit 101T includes a digital-to-analog converter (DAC) 105, a low-pass filter (LPF) 110, a mixer 115 connected to a local oscillation signal LO, a power amplifier 120, a transducer 125, and a power detector 130. The analog signal receiving circuit 101R includes an amplifier 140 such as a low noise amplifier (LNA), a transducer 145, a mixer 150, a band-pass filter (BPF) 155, and an amplifier 160. The antenna unit 1002 is used for sending and receiving wireless signals via Bluetooth communication standard. The processing circuit 103 includes a multiplexer 165, an analog-to-digital converter (ADC) 170, and a signal processing circuit 175 wherein the signal processing circuit 175 can be a baseband control circuit or a digital signal processing circuit. In addition, the wireless transceiver apparatus 100 further comprises four switch elements SW1-SW4. The switch element SW1 is selectively coupled between an output of the transducer 145 and an input of the mixer 150. The switch element SW2 is selectively coupled between the output of the transducer 145 and an input of the power detector 130. The switch element SW3 is selectively coupled between the output of the transducer 145 and another input of the power detector 130. The switch element SW4 is selectively coupled between the output of the amplifier 160 and the input of the multiplexer 165. The state (open or short) of each switch element SW1-SW4 can be controlled by the signal processing circuit 175 within the processing circuit 103, and each switch element SW1-SW4 can be respectively turned on to become short or turned off to become open in response to different operations of the wireless transceiver apparatus 100. The electrical connections between other circuit elements are illustrated on FIG. 1.

Figure 2:
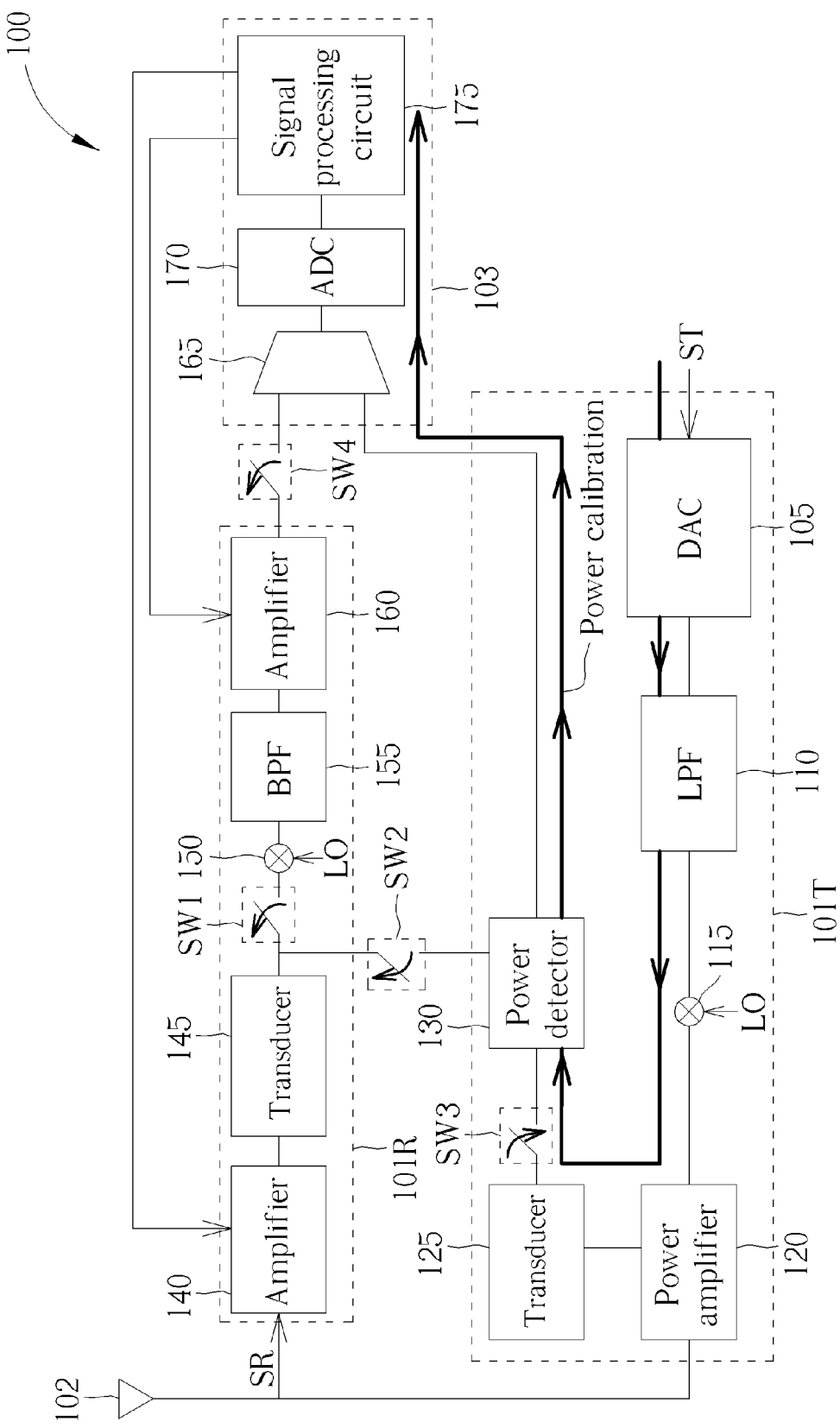
FIG. 2 is a diagram illustrating the signal processing flow of the wireless transceiver apparatus of FIG. 1 when operating under the power calibration mode.

FIG. 2 is a diagram illustrating the signal processing flow of the wireless transceiver apparatus 100 of FIG. 1 operating under the power calibration mode. When the wireless transceiver apparatus 100 enters the power calibration mode, the signal processing circuit 175 is arranged to control the switch elements SW1, SW2, and SW4 to become open and control the switch element SW3 to become short. The multiplexer 165 of processing circuit 103 is arranged to select the output signal of the power detector 130 as its output. As indicated by arrows shown in FIG. 2, the transmission signal ST passes through the DAC 105, LPF 110, mixer 115, power amplifier 120, transducer 125, power detector 130, multiplexer 165, and the ADC 170, and is processed by these circuit elements correspondingly and finally transmitted to the signal processing circuit 175. The power detector 130 is used for performing power detection upon the transmission signal ST to detect the signal power of power amplifier 120 on the transmitting path at the wireless signal transmission side. The signal processing circuit 175 can control the power amplifier 120 to perform the power calibration according to the detection result generated by the power detector 130, to maintain the power of the wireless transmission signal to be transmitted to the air at the same level substantially.

Figure 3:
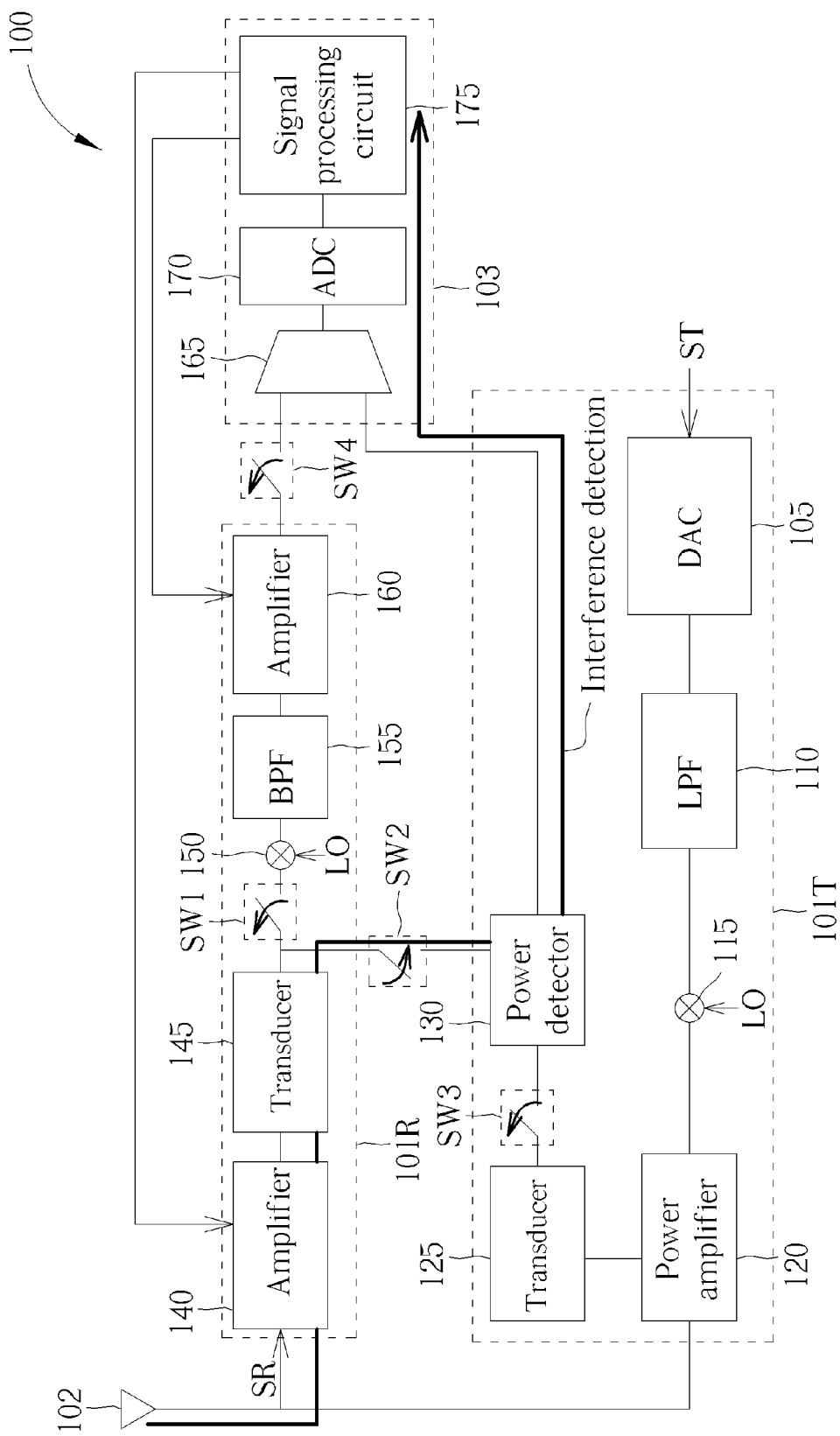
FIG. 3 is a diagram illustrating the signal processing flow of the wireless transceiver apparatus of FIG. 1 when operating under the interference detection mode.

FIG. 3 is a diagram illustrating the signal processing flow of the wireless transceiver apparatus 100 of FIG. 1 operating under the interference detection mode. As shown in FIG. 3, when the wireless transceiver apparatus 100 enters the interference detection mode, the signal processing circuit 175 is arranged to control the switch elements SW1, SW3, and SW4 to become open and control the switch element SW2 to become short. The multiplexer 165 of processing circuit 103 selects the output signal of power detector 130 as its output. Under the interference detection mode, the wireless signal SR detected by the wireless transceiver apparatus 100 is regarded as an interference signal rather than a data signal or a data packet. As indicated by arrows shown in FIG. 3, if the interference of Wi-Fi signals exists, then the signal interference will be received by the antenna unit 102 and transmitted through the amplifier 140, transducer 145, power detector 130, multiplexer 165, ADC 170, and finally transmitted to the signal processing circuit 175. That is, the analog signal receiving circuit 101R is arranged to transfer the received wireless signal (i.e. the Wi-Fi signal) to the power detector 130, and the received wireless signal (Wi-Fi signal) does not pass through the mixer 150, BPF 155, and the amplifier 160. The power detector 130 performs power detection for the energy or power of Wi-Fi signal interference, to detect the power of Wi-Fi signal interference, measure an interference power value, and transmit the interference power value to the processing circuit 103. The ADC 170 of processing circuit 103 is arranged to convert the interference power value into a digital value, and the signal processing circuit 175 is arranged to adaptively control the gain value of at least one amplifier in the amplifiers 140 and 160 within the analog signal receiving circuit 101R according to the digital value under the signal reception mode, to avoid signal saturation.

Figure 4:
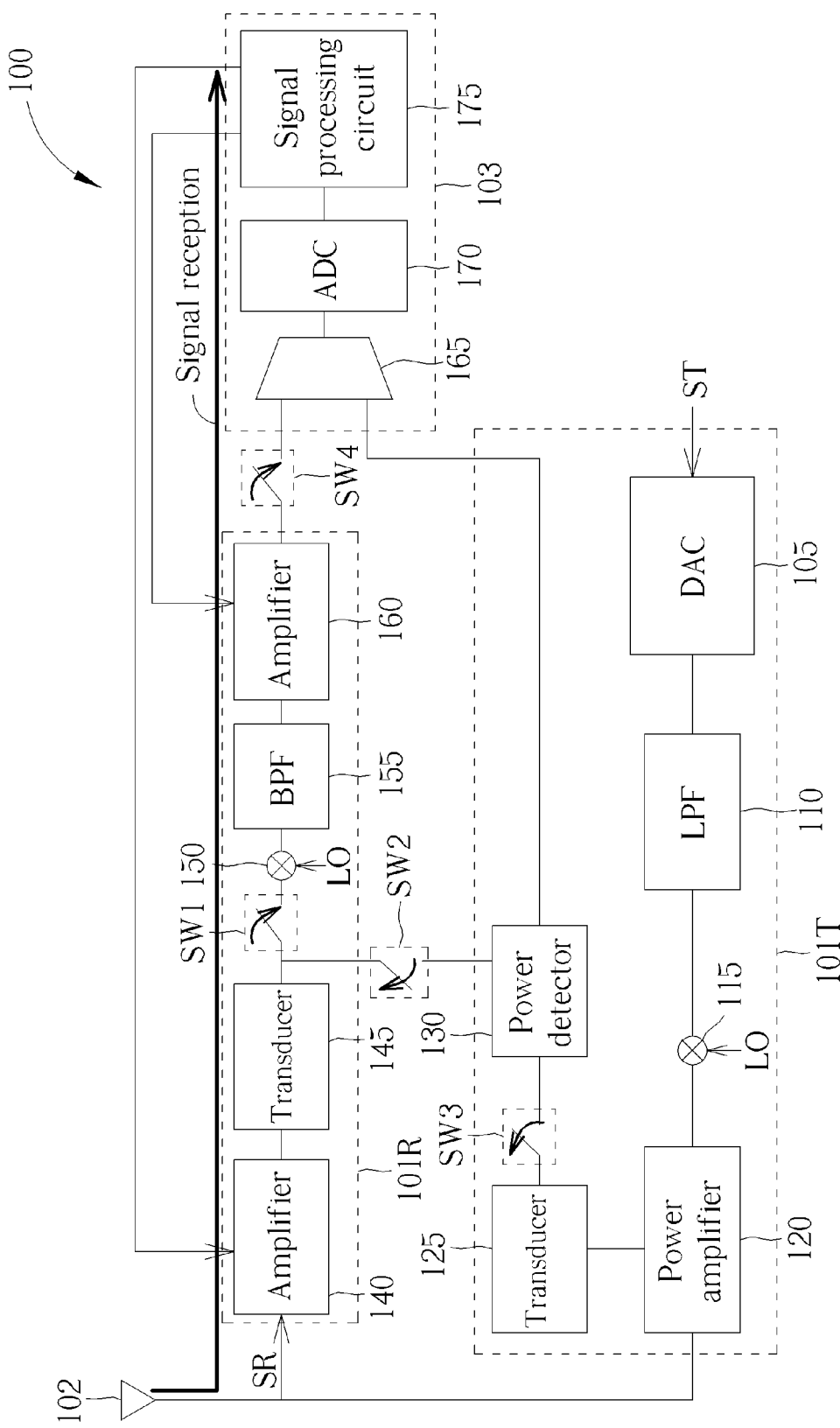
FIG. 4 is a diagram illustrating the signal processing flow of the wireless transceiver apparatus of FIG. 1 when operating under the signal reception mode.

FIG. 4 is a diagram illustrating the signal processing flow of the wireless transceiver apparatus 100 of FIG. 1 operating under the signal reception mode. The signal processing circuit 175 is arranged to control the switch elements SW2 and SW3 to become open and control the switch elements SW1 and SW4 to become short. The multiplexer 165 of processing circuit 103 is arranged to select the output signal of the amplifier 160 as its output. Under the signal reception mode, the wireless signal SR detected by the wireless transceiver apparatus 100 is regarded as a dada signal or a data packet. As indicated by arrows shown in FIG. 4, the wireless signal SR transmitted with Bluetooth communication standard is received by the antenna unit 102 and then is transmitted and received by the analog signal receiving circuit 101R. The wireless signal SR is sequentially transmitted through the amplifier 140, transducer 145, mixer 150, BPF 155, amplifier 160, multiplexer 165, ADC 170, and finally transmitted to the signal processing circuit 175. When the wireless transceiver apparatus 100 enters the analog reception mode to receive Bluetooth data packet(s), the signal processing circuit 175 can adaptively control the gain value of at least one amplifier in the amplifiers 140 and 160 within the analog signal receiving circuit 101R according to the interference detection result generated by the power detector 130, to avoid signal saturation. In practice, when the digital value is higher than a first threshold value, the signal processing circuit 175 can control the gain value of at least one amplifier as a first gain value. When the digital value is higher than a second threshold value, the signal processing circuit 175 can control the gain value of the at least one amplifier as a second gain value. By doing this, the interference of other signal sources can be reduced. The second threshold value is higher than the first threshold value, and the second gain value is smaller than the first gain value. The above-mentioned scheme for adjusting the gain value based on the threshold values is one embodiment for illustrative purposes. In other embodiments, a single threshold value can be used for deciding and adjusting the gain value(s) of the amplifier(s). For example, when the digital value is higher than the single threshold value, the gain value of an amplifier is decreased; instead, when the digital value is lower than the single threshold value, the gain value is increased.

It should be noted that the invention aims at utilizing at least the power detector, which is at the wireless signal transmission side and used for power calibration for the transmission signal, to perform interference detection operation. In other embodiments, the arrangement positions of switch elements SW1-SW3 can be adjusted and changed to further utilize the transducer 125 to perform interference detection operation. In practice, the arrangement position of switch element SW1 can be changed to be coupled between the output of the amplifier 140 and the input of the transducer 145. The arrangement position of switch element SW2 can be changed to be coupled between the output of the amplifier 140 and the input of the transducer 125. The arrangement position of switch element SW3 can be changed to be coupled between the output of the power amplifier 120 and the input of the transducer 125. The control of the corresponding switch elements is identical to that of switch elements as shown in FIG. 1, and is not detailed for brevity. Further, in another embodiment, the analog signal receiving circuit 101R can be configured to include the LNA 140 and exclude the amplifier 160. The operation of controlling the gain value (s) of amplifier (s) to avoid signal saturation resulted from other interference signals can comprise the operation of controlling the gain value of merely a single one amplifier within the analog signal receiving circuit 101R and/or the operation of controlling the gain values of two or more amplifiers. This also obeys the spirit of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless transceiver apparatus, comprising:
   a power detector, configured at a wireless signal transmission side and used for detecting power of a power amplifier on a transmitting path of the wireless signal transmission side;
   an analog signal receiving circuit, configured at a wireless signal reception side and coupled to the power detector, the analog signal receiving circuit receiving a wireless signal form an antenna; and
   a processing circuit, coupled to the analog signal receiving circuit;
   wherein, under a signal reception mode, the analog signal receiving circuit transmits the received wireless signal to the processing circuit; under an interference detection mode, the analog signal receiving circuit transfers the received wireless signal to the power detector, and the power detector detects a power of the received wireless signal to measure an interference power value and transmit the interference power value to the processing circuit.

2. The wireless transceiver apparatus of claim 1, wherein the processing circuit is used for converting the interference power value to a digital value and controlling a gain value of at least one amplifier of the analog signal receiving circuit according to the digital value.

3. The wireless transceiver apparatus of claim 2, wherein when the digital value is greater than a first threshold value, the processing circuit is arranged to control and determine the gain value of the at least one amplifier as a first gain value; and, when the digital value is greater than a second threshold, the processing circuit is arranged to control and determine the gain value of the at least one amplifier as a second gain value to reduce interference wherein the second threshold value is higher than the first threshold value and the second gain value is smaller than the first gain value.

4. The wireless transceiver apparatus of claim 2, wherein the analog signal receiving circuit comprises:
   a first amplifier, coupled to the antenna;
   a mixer, coupled to the first amplifier;
   a band-pass filter, coupled to the mixer;
   a second amplifier, coupled to the band-pass filter;
   wherein the processing circuit respectively controls a gain value of the first amplifier and a gain value of the second amplifier according to the digital value.

5. The wireless transceiver apparatus of claim 4, further comprising:
   a first switch, disposed between the first amplifier and the mixer;
   a second switch, disposed between the analog signal receiving circuit and the power detector;
   a third switch, disposed between the power detector and the power amplifier on the transmitting path; and
   a fourth switch, disposed between the analog signal receiving circuit and the processing circuit;
   wherein under the signal reception mode, the processing circuit controls states of the first switch, the third switch, and the fourth switch become closed respectively; and under the power detection mode, the processing circuit controls the states of the first switch, the third switch, and the fourth switch become open respectively and controls a state of the second switch become closed.

6. The wireless transceiver apparatus of claim 1, wherein the wireless transceiver apparatus includes a Bluetooth communication capability, and under the signal reception mode the wireless transceiver apparatus is arranged to receive Bluetooth data packet(s) and is arranged to enable and enter the interference detection mode when is not arranged to receive the Bluetooth data packet(s).

7. The wireless transceiver apparatus of claim 6, wherein the wireless transceiver apparatus is arranged to enable and enter the interference detection mode before receiving a preamble signal of Bluetooth communication, or the wireless transceiver apparatus is arranged to enable and enter the interference detection mode after completely receiving one Bluetooth data packet.

8. A method used for a wireless transceiver apparatus, comprising:
   providing a power detector configured at a wireless signal transmission side;
   providing an analog signal receiving circuit configured at a wireless signal reception side, the analog signal receiving circuit receiving a wireless signal form an antenna;
   under a signal reception mode, utilizing the analog signal receiving circuit to transmit the received wireless signal to a processing circuit; and
   under an interference detection mode:
      transferring the received wireless signal from the analog signal receiving circuit to the power detector; and
      utilizing the power detector to detect a power of the received wireless signal to measure an interference power value and transmit the interference power value to the processing circuit.

9. The method of claim 8, further comprising:
   converting the interference power value to a digital value; and
   controlling a gain value of at least one amplifier of the analog signal receiving circuit according to the digital value.

10. The method of claim 9, wherein the step of controlling the gain value of the at least one amplifier of the analog signal receiving circuit according to the digital value comprises:
   controlling and determining the gain value of the at least one amplifier as a first gain value when the digital value is greater than a first threshold value; and
   controlling and determining the gain value of the at least one amplifier as a second gain value to reduce interference when the digital value is greater than a second threshold;
   wherein the second threshold value is higher than the first threshold value and the second gain value is smaller than the first gain value.

* * * * *